United States Patent
Buttner et al.

[11] Patent Number: 5,815,590
[45] Date of Patent: Sep. 29, 1998

[54] TARGET LIGHT DETECTION

[75] Inventors: Gary J. Buttner; Rodney Norman, both of Napean, Canada

[73] Assignee: CAL Corporation, Ottawa, Canada

[21] Appl. No.: 769,625

[22] Filed: Dec. 18, 1996

[51] Int. Cl.[6] .............................. G06K 9/20; G01C 21/02
[52] U.S. Cl. ......................... 382/103; 382/218; 382/274; 220/203.3; 220/203.4; 220/203.6
[58] Field of Search ..................................... 382/103, 218, 382/274, 270; 250/203.3, 203.4, 203.6; 348/169

[56] References Cited

U.S. PATENT DOCUMENTS

| | | | |
|---|---|---|---|
| 5,260,557 | 11/1993 | Kissh et al. | 250/203.6 |
| 5,384,860 | 1/1995 | Gardemal, Jr. et al. | 382/103 |

*Primary Examiner*—Scott Rogers
*Attorney, Agent, or Firm*—Pascal & Associates

[57] ABSTRACT

A method of determining the existence of a target light source comprising progressively receiving successive pixel intensity values row by row and column by column of a scanned array of a light detector, comparing each pixel intensity value as it is received with upper and lower thresholds, declaring successive rows of pixels as dark, bright, edge or null depending on whether each row of the intensity values above, between and below the thresholds meets predetermined criteria, declaring a light source as detected in the event an array of pixels exceeding the lower threshold are completely surrounded by pixels which are of lower intensity than the lower threshold, and storing a signal indicating detection of a light source in a memory with a location identifying an address of the array in which the light source was declared as detected.

10 Claims, 2 Drawing Sheets

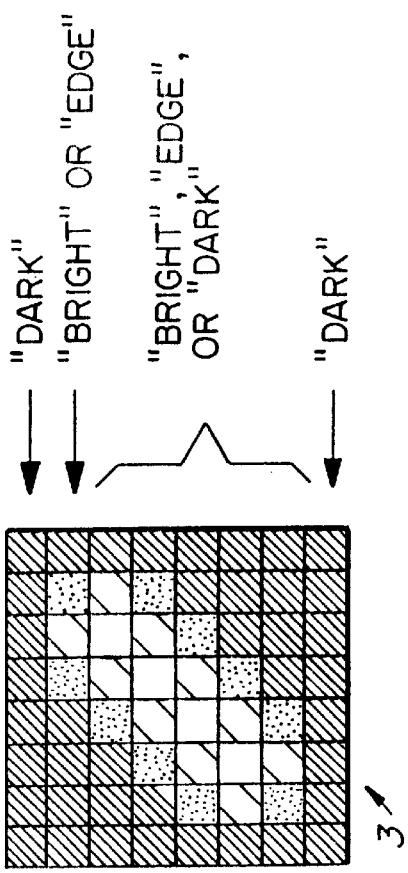
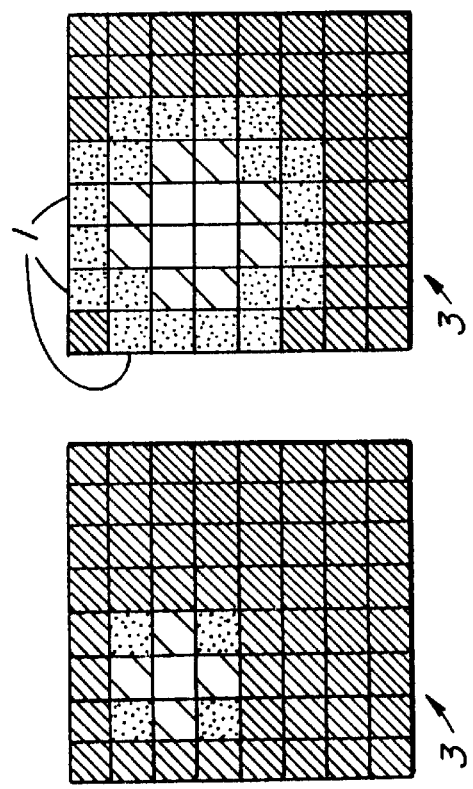
FIG. 1A
FIG. 1B
FIG. 1C
"DARK"
"BRIGHT" OR "EDGE"
"BRIGHT", "EDGE", OR "DARK"
"DARK"

TARGET LIGHT DETECTION

FIELD OF THE INVENTION

This invention relates to a method of determining the existence of target light sources such as stars from a light sensor such as a charge coupled device.

BACKGROUND TO THE INVENTION

The determination of target light sources is required for navigation of spacecraft, for military target acquisition, for image tracking, etc. Typically an image is sensed in a charge coupled device (CCD) array, which downloads the detected light intensity to a memory where it is stored. A software program analyzes the stored image and determines that a light source is present.

The determination of the presence of a light source can be done by various methods. One of the methods involves applying a connectivity algorithm, as described in U.S. Pat. No. 5,384,860 issued Jan. 24, 1995 to Loral Aerospace Corp., which involves determining that a pixel is part of a potential positive contrast target if there is an arbitrary closed path of any shape existing around the subject pixel. The structure to perform this algorithm is a magnitude comparator array which is enabled by signals from successive stages of a delay line to which the signal is applied. Eight lines of digitized video are retained in the delay line. It is clear that this system is expensive, and can be fooled by atmospheric reflections, since the major criterion is that a closed path should exist around the pixel being considered. Further, storage of the image in a delay line prior to analysis slows the process; by the time the image progresses down the delay line and is analyzed, the light source could have moved below the horizon.

U.S. Pat. No. 5,260,557 issued Nov. 9, 1996 to Hughes Aircraft Company requires that a light source not be within two pixels of a window edge. Because the system uses software to determine the presence of a light source, it is slow, making it unsuitable for acquisition of a light source moving at high speed.

SUMMARY OF THE INVENTION

The present invention contains an unique method for determining the presence of a light source, which has been found to be accurate, is not fooled or overloaded by bright light sources such as the sun, and is very fast, making it suitable for acquisition of a light source moving at high speed. Light patterns are processed from digitized pixels of preferably a CCD image as they are received from the CCD image, in a hardware circuit. Thus the image need not be stored in the CCD for subsequent analysis, and the entire image window need not be stored in a delay line.

In the presence invention, in contrast, an indication of the significance of the pixel intensities in a row, determined as a row of pixel intensity values is received, is stored in an image memory. This saves time consuming steps as compared with the method described in U.S. Pat. No. 5,384,860 described above.

In accordance with an embodiment of the present invention, a method of determining the existence of a target light source is comprised of progressively receiving successive pixel intensity values row by row and column by column of a scanned array of a light detector, comparing each pixel intensity value as it is received with upper and lower thresholds, declaring successive rows of pixels as dark, bright, edge or null depending on whether each row of said intensity values above, between and below said thresholds meets predetermined criteria, declaring a light source as detected in the event an array of pixels exceeding said lower threshold are completely surrounded by pixels which are of lower intensity than the lower threshold, and storing a signal indicating detection of a light source in a memory with a location identifying an address of the array in which the light source was declared as detected.

In accordance with another embodiment, apparatus for determining the existence of a target light source is comprised of (a) register apparatus for storing upper and a lower pixel value thresholds, apparatus for comparing a stream of pixel intensity values received in an array of rows and columns from a scanned CCD with said thresholds, and for indicating whether each of said values of a row of said values are above, below, or between said thresholds, logic apparatus for receiving said indications and determining whether each row is a dark, a bright, an edge, or a null row, depending on first predetermined criteria, apparatus for determining whether a combination of the determinations for the rows of the array conforms to second predetermined criteria, and apparatus for indicating the presence of a light source if the second predetermined criteria are met.

BRIEF INTRODUCTION TO THE DRAWINGS

A better understanding of the invention will be obtained by considering the detailed description below, with reference to the following drawings, in which:

FIGS. 1A, 1B and 1C illustrate examples of patterns of light sources in an array, FIG. 2 is a block diagram of an embodiment of the invention.

DETAILED DESCRIPTION OF PREFERRED EMBODIMENT

Figure 2:
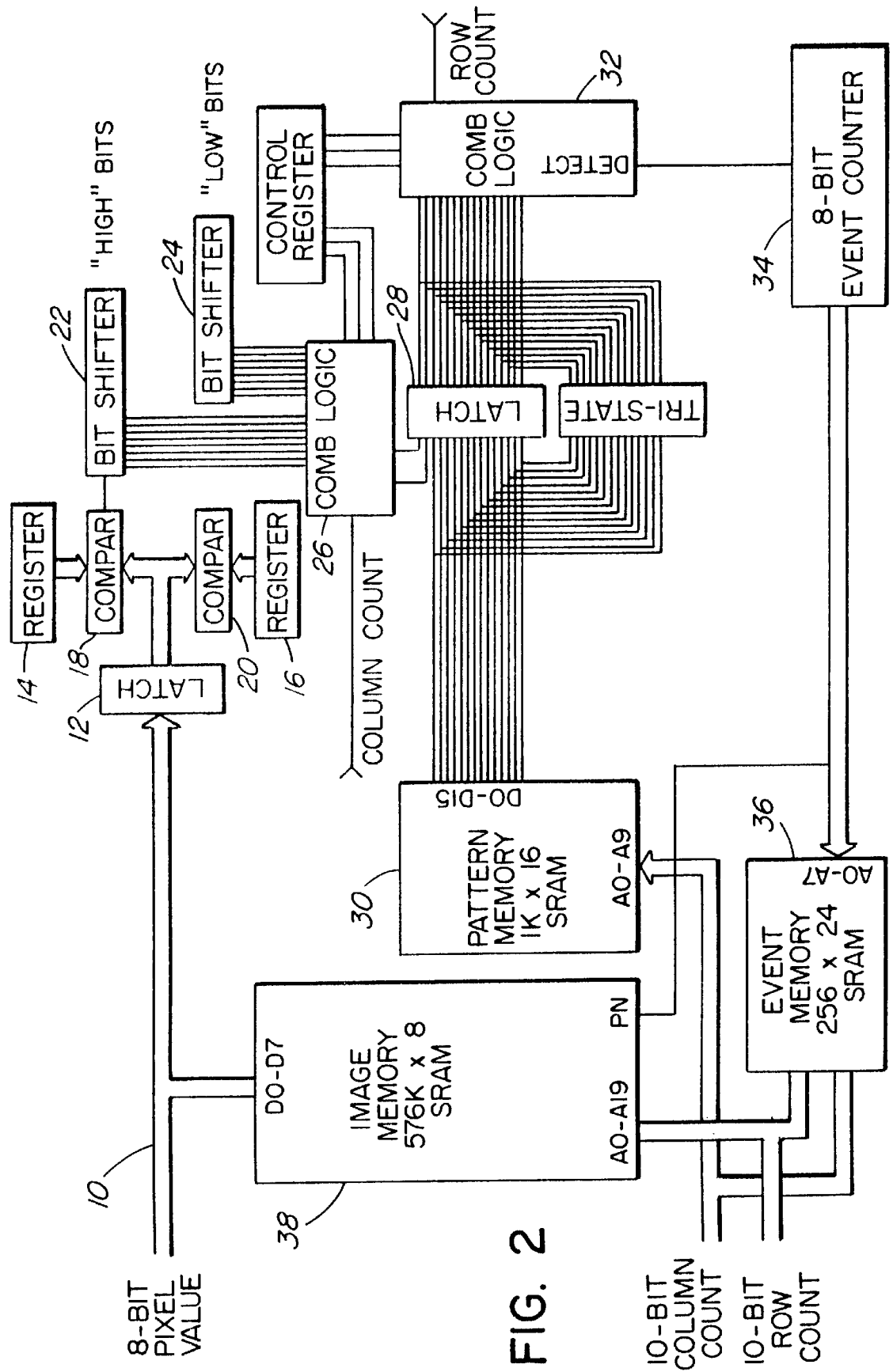

Turning to FIG. 1, the present invention performs the aforenoted connectivity algorithm in accordance with predetermined criteria, rather than merely determining that the point source is surrounded by a closed path of any shape. The connectivity algorithm would provide that a two dimensional group of pixel intensity values should contain at least one bright pixel surrounded on all sides by dark pixels.

Examples which would fit this pattern are illustrated as FIGS. 1A and 1C, with FIG. 1B being uncertain due to pixels 1 exhibiting a shade of gray being located at two edges of the pixel array 3. Pixel array 3 is illustrated as having 8 rows and 8 columns, i.e. 64 pixels.

In accordance with a preferred embodiment of the present invention, the intensity value of each pixel as it is received is compared with predetermined upper and lower thresholds. The pixel will thus be below, above, or between the thresholds (the pixel having value at the threshold being arbitrarily included above or below the threshold).

A row is declared to be dark when the intensity values of all pixels in the row are below the predetermined lower threshold.

A row is declared to be light when the intensity levels of pixels at the beginning and end of the row are below the lower threshold and at least one other pixel within the row exceeds an upper threshold.

A row is declared to be edge when the intensity values of pixels at the beginning and end of the row are below the lower threshold and the pixels between them are of any intensity value which is above the lower threshold.

The first and last rows of the array must be found to be "dark". The second row must be found to be bright or an edge. The rows between the second row and the last row can be any of bright, edge or dark rows. Rows not conforming to these types are considered to be "null" rows, and disqualify the pattern as a potential light source.

FIG. 2 illustrates a block diagram of a circuit that can be used to implement the present invention, although other circuits can be used. The circuit to be described below is preferably constructed as an application specific integrated circuit (ASIC).

An array of pixels in a CCD is scanned row by row and the output signal is either digitized or is emitted in digital form, the resulting flow of pixel data is applied to an input 10, e.g. as an 8 bit intensity value. The values are successively latched in latch 12. Registers 14 and 16 are loaded from a processor, which is not part of the present invention, with upper and lower threshold values respectively.

The latched signal values are applied to upper and lower threshold value comparators 18 and 20, which also receive the threshold values stored in registers 14 and 16. Signals which represent the result of the comparisons are fed to respective 8 bit shift registers 22 and 24.

The shift registers are clocked one bit from an external clock source each time a new pixel is entered, which in synchronism with the array scanning rate, i.e. the rate at which the data representing each successive pixel is received. Thus the data stored in shift register 22 at the end of a row represents a logical output from comparator 18 indicating whether each pixel is above or below the upper threshold, and the data stored in shift register 24 represents a logical output from comparator 20 indicating whether each pixel is above or below the lower threshold.

The data stored in the shift registers 22 and 24 is applied to combinational logic circuit 26 (which can, for example, be comprised of a state machine), to determine whether the eight pixels conform to a dark, a bright, an edge, or a null row. The results are represented by a two bit binary result code at outputs R1 and R2.

A column count received by the logic circuit 26 from a pixel signal detector circuit (not shown), should also cause the logic circuit to ensure that the first valid result is produced after eight pixels are processed, since the first seven pixels in each row will produce null results.

The result code at outputs R1 and R2 are latched in latch 28, and are stored in a pattern memory 30. The result codes being an indication of whether the entire row is dark, bright, edge or null distinguishes from the actual pixel values are stored in either a random access memory or a delay line memory prior to processing. By the time storage of any data relating to pattern is stored in the present invention, processing of a significant part of the data (e.g. the nature of an entire row) has already been completed.

Now the outputs of the latch 28 are applied to combinational logic circuit 32 (which may be a state machine), to determine whether the dark, bright, edge and null row data combination qualifies as a valid light source detection, which will be positive if they conform to the criteria described earlier. The resulting logic value produced by logic circuit 32 is output at the detect output thereof.

The seven most recent data at the R1 and R2 outputs are rewritten back to the pattern memory 32 and the eighth row data is dropped. In this manner, the data stored in the pattern memory is progressively shifted, to keep up with the changing image rows.

The row count received by the logic circuit 26 from a pixel signal detector circuit is used to ensure that a valid detect signal is only produced starting on the eighth row.

The detect signal from logic 32 is applied to an event counter 34 which counts event outputs from the logic circuit 32 corresponding to the determination location of the existence of a light source. An output of the event counter 34, which corresponds to the occurrence of each event indicative of the presence of a light source, is applied to an enable input of an event memory 36. The row and column count received from the CCD detector is applied to address inputs to event memory 36. The window location of each event which is the detection of light source is thus stored in event memory 36. Event memory can for example be a 256×24 bit static random access memory.

The pixel values received from the input 10 are applied to an image memory 38, as are the row and column values. The pixel value of each pixel is thus stored in image memory 38 at memory addresses corresponding to the row and column counts. Image memory 38 can be a 576K×8 bit static random access memory.

Data is read from the event counter by an external processor at the end of a multi-array image reading process. This indicates to the processor how many valid light sources were detected. The row and column values for each light source is then read from the event memory 36. For each light source, the processor then reads the corresponding 8×8 sub-image corresponding to a single array from the image memory, and centroids the light source contained therein.

The processed array forms, in effect, a moving subwindow which describes the pattern of pixels within the window viewed by the CCD. This moving subwindow moves with the current pixel position being downloaded from the CCD image. The subwindow pattern memory is shifted to track with the changing current pixel position.

Whenever the current subwindow pattern qualifies as a point light source, the location of the window, having been stored in the image memory, can be used immediately by an external processor. This significantly improves the ability of the method to provide image data to equipment that could use it, such as a steering mechanism, in a timely manner.

The present invention thus can be used to process light patterns from an image consisting of digitized pixels, distinguishing localized point light sources such as stars from general background light sources and other clutter.

A person understanding this invention may now conceive of alternative structures and embodiments or variations of the above. All those which fall within the scope of the claims appended hereto are considered to be part of the present invention.

I claim:

1. A method of determining the existence of a target light source comprising:
    (a) progressively receiving successive pixel intensity values row by row and column by column of a scanned array of a light detector,
    (b) comparing each pixel intensity value as it is received with upper and lower thresholds,
    (c) declaring successive rows of pixels as dark, bright, edge or null depending on whether each row of said intensity values above, between and below said thresholds meets predetermined criteria,
    (d) declaring a light source as detected in the event an array of pixels exceeding said lower threshold are completely surrounded by pixels which are of lower intensity than the lower threshold, and
    (e) storing a signal indicating detection of a light source in a memory with a location identifying an address of the array in which the light source was declared as detected.

2. A method as defined in claim 1 in which the criteria are that a row is declared as dark in the event the intensity levels of all pixels of a row are below the lower threshold, a row is declared as bright in the event the intensity levels of pixels at the beginning and end of the row are below the lower threshold and at least one pixel in the row is in excess of an upper threshold, and a row is declared as edge in the event the intensity levels of pixels at the beginning and end of the row are below the lower threshold and all pixels between the beginning and end of the row are below the upper threshold.

3. A method as defined in claim 2 in which the criteria include a first and last row being declared as dark and a second row being declared as bright or edge.

4. A method as defined in claim 3 in which any of the third through second last row inclusive are declared as any of bright, dark and edge.

5. A method as defined in claim 4 in which the number of pixels is eight.

6. A method as defined in claim 4 including:

(f) stepping said array in one direction pixel by pixel, and (g) repeating steps (a)–(e), and subsequently repeating step (f) and (g) at the same rate as pixels are received.

7. Apparatus for determining the existence of a target light source comprising:

(a) register means for storing upper and a lower pixel value thresholds, (b) means for comparing a stream of pixel intensity values received in an array of rows and columns from a scanned CCD with said thresholds, and for indicating whether each of said values of a row of said values are above, below, or between said thresholds, (c) logic means for receiving said indications and determining whether each row is a dark, a bright, an edge, or a null row, depending on first predetermined criteria, (d) means for determining whether a combination of said determinations for the rows of said array conforms to second predetermined criteria, (e) means for indicating the presence of a light source if the second predetermined criteria are met.

8. Apparatus as defined in claim 7 including means for counting the number of times the second predetermined criteria are met, and for storing a signal indicating that the second predetermined criteria are met, and an address of the window each time the second predetermined criteria are met.

9. Apparatus as defined in claim 8, including means for storing pixel values of the array each time the second predetermined criteria are met, and a memory address of the window each time the second predetermined criteria are met.

10. Apparatus as defined in claim 7 in which the first criteria are that:

(a) a row is declared to be dark when the intensity values of all pixels in the row are below the predetermined lower threshold, a row is declared to be light when the intensity levels of pixels at the beginning and end of the row are below the lower threshold and at least one other pixel within the row exceeds an upper threshold, and a row is declared to be edge when the intensity values of pixels at the beginning and end of the row are below the lower threshold and the pixels between them are of any intensity value which is above the lower threshold;

and in which the second criteria are that:

(b) first and last rows of the array must be found to be "dark", the second row must be found to be bright or an edge, the rows between the second row and the last row can be any of bright, edge or dark rows, and rows not conforming to these types are considered to be "null" rows and disqualify a pattern defined by the array as a potential light source.

* * * * *